(12) United States Patent
Lester

(10) Patent No.: US 6,318,744 B1
(45) Date of Patent: Nov. 20, 2001

(54) TRIANGLAR BICYCLE FRAME

(76) Inventor: Donald Eugene Lester, 43 Irving St., West Medford, MA (US) 02155

( * ) Notice: Subject to any disclaimer, the term of this patent is extended or adjusted under 35 U.S.C. 154(b) by 0 days.

(21) Appl. No.: 09/304,557

(22) Filed: May 4, 1999

Related U.S. Application Data

(60) Provisional application No. 60/086,785, filed on May 26, 1998.

(51) Int. Cl.[7] ........................................ B62K 3/04
(52) U.S. Cl. ............................. 280/281.1; 280/274
(58) Field of Search ..................... 280/281.1, 274

(56) References Cited

U.S. PATENT DOCUMENTS

| | | | |
|---|---|---|---|
| 473,829 | | 4/1892 | Diamond . |
| 526,265 | * | 9/1894 | De Rossetti ......................... 248/575 |
| 527,404 | * | 10/1894 | Byrne .................................... 280/227 |
| 544,427 | | 8/1895 | Collins et al. . |
| 578,269 | * | 3/1897 | Savorgnan ............................... 74/54 |
| 625,835 | * | 5/1899 | Davis ..................................... 74/349 |
| 2,244,709 | * | 6/1941 | Kinzel ................................. 280/281.1 |
| 4,577,879 | * | 3/1986 | Vereyken .............................. 280/256 |
| 5,211,415 | * | 5/1993 | Gasiorowski ....................... 280/281.1 |
| 5,240,268 | * | 8/1993 | Allsop et al. ...................... 280/281.1 |
| 5,284,354 | * | 2/1994 | McWethy ............................. 280/284 |
| 5,509,678 | * | 4/1996 | Ullman et al. .................... 280/281.1 |
| 5,685,553 | * | 11/1997 | Wilcox et al. ....................... 280/283 |
| 6,012,733 | * | 1/2000 | Rafoth ............................... 280/281.1 |

OTHER PUBLICATIONS

Aero–comp brochure.
Schwinn bicycle brochure.

* cited by examiner

Primary Examiner—Brian L. Johnson
Assistant Examiner—Deanna Draper

(57) ABSTRACT

A beyond 2000 frame design that corrects faults in road bicycles by creating a lightweight bicycle with rigid cranks and a resilient saddle. An improbable mix brought about by attaching the seat stays to the upper slope of the down tube thus enclosing the bottom bracket in a rigid triangulated box that eliminates stays to the top of the frame in a direct line of shock to the base of the spine. Resulting in this rigid yet resilient, (no hands accurate) safe bicycle that climbs effortlessly and descends as if on rails.

1 Claim, 3 Drawing Sheets

Minus top tube

TRIANGLAR BICYCLE FRAME

This Appln claims benefit of Ser. No. 60/086,785 filed May 26, 1998.

BACKGROUND AND PRIOR ART

This invention pertains to improving the rideability of road bicycles by improving prevailing dominant art. Specifically relegating Diamond 473,829 to history. This indomitable unduly harsh rear frame art has dominated since conception due to the unsurpassed efficiency in the snapback resilience inherent in triangulated light steel stays. The world was young and had fallen in love with bicycles, so it was embraced unconditionally and hears little criticism today. But despite longevity, Diamond art was not fully embraced, as the triangulated rear frame section leaves the seat stays in a direct line of shock from the axle to the base of the spine, via the seatpost. Uncomfortable? Yes. And stays behind the seat tube add little to the rigidity needed to stave off flex induced leg cramps. Collins 544,427 shows a bicycle with Diamond art that is identical to contemporary art. Nothing has changed in over a century, the same strengths and weaknesses are still intrinsic. The dilemma one is confronted with in improving bicycle art is solving the improbable mix of resilience and rigidity: resilience for comfort and rigidity at the cranks for efficiency. Opposites in the same light weight frame that have to be melded without cancelling each other out.

There has always been need for improvement in Diamond art. The demand for light weight bicycles resulted in a frame too flexible to maintain wheel alignment. Two long thin tubes, the top and down tube are insufficient to maintain head tube rigidity, inducing fork flex that prescribes slow, vague, inaccurate steering. Yet, despite these flaws, this art became derigueur and, as decades passed, attempts to displace it were futile.

SUMMARY OF INVENTION

Diamond was displaced by altering the final act of the frame building process, the attachment of the seat stays. Modified, by directing extra long seat stays diagonally forward clear of the seat tube to the upper slope of the down tube and brazing the junction at 2½ inches past center. This places the bottom bracket in a four sided (boxed) triangulated structure of immense strength, bringing about, a metamorphosis in bicycles. The sum being greater than the whole.

The ride brings to mind: "The Missing Link." as one mulls how it took so long to find . . . "It flat works!"

DETAILED DISCRIPTION OF THE INVENTION

This invention relates to improving conventional steel tube road bicycles by correcting age old faults:

FAULTS

1. Uncomfortably stiff over less than smooth roads.
2. Flex at the bottom bracket that siphons off energy at the cranks.
3. Inexact steering due to frame flex affecting fork.

These three faults are dissected as the design of this bicycle unfolds, but, suffice to say that just one modification, the realignment of the seat stays, cured these three faults simultaneously.

Figure 1:
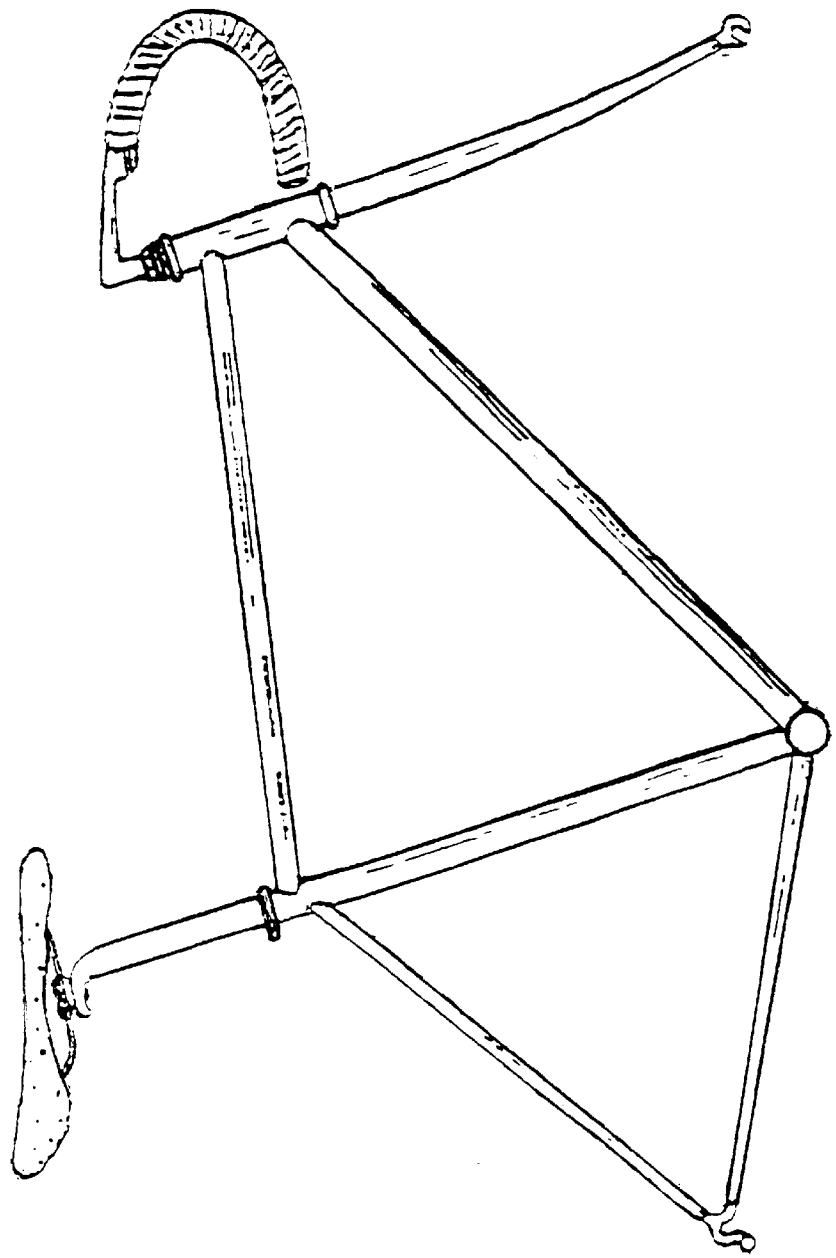
FIG. 1 conventional bicycle frame at top . . . Grail invention at bottom.
Figure 2:
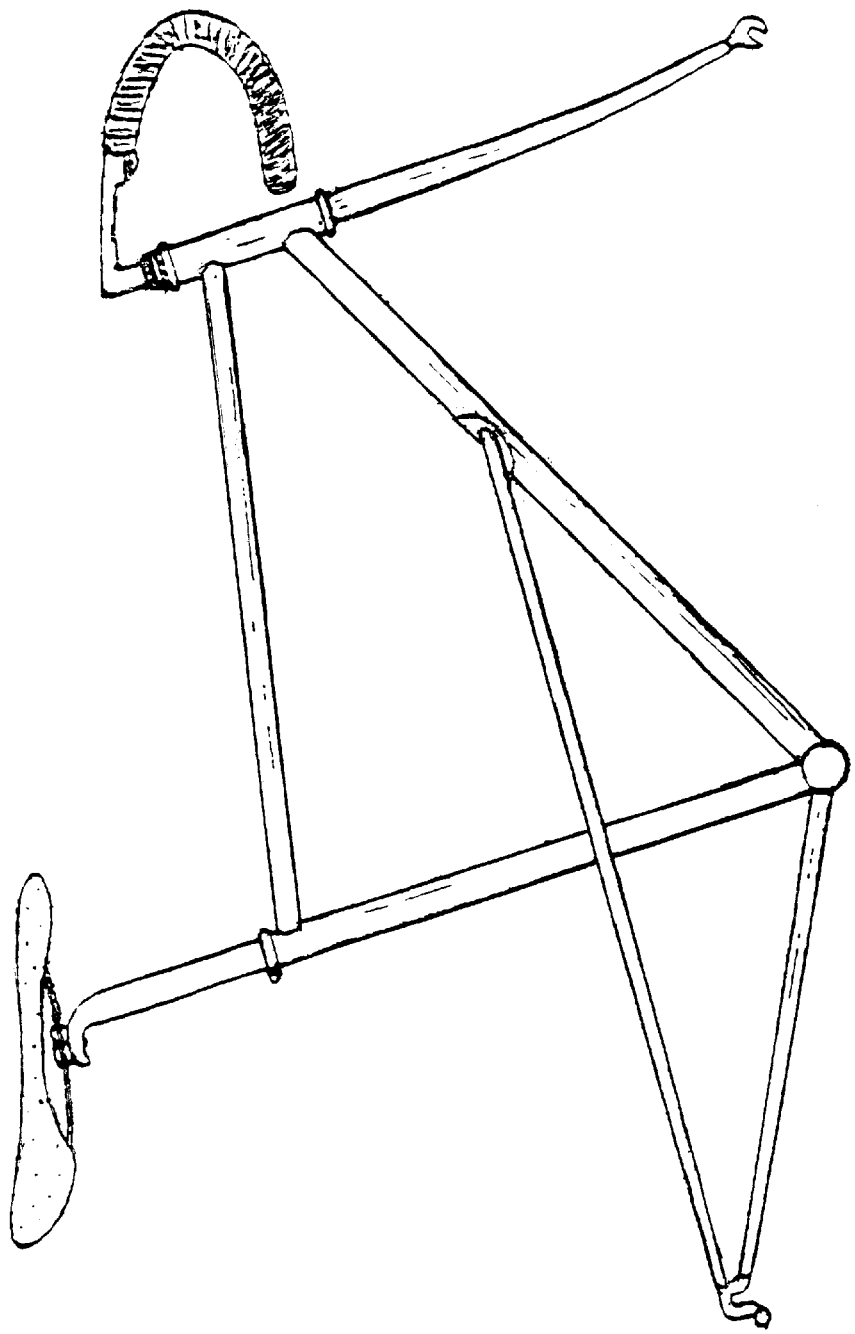
FIG. 2 Grail bicycle frame builders dimensions.
Figure 3:
FIG. 3 Photocopies of Diamond and Collins art.

As shown in FIG. 1, the difference between Frame 1 and 2 is, the seat stays in Frame 2 are aligned differently. Frame 2 shows where extra long stays are re routed clear of the seat tube to diagonally converge with the upper slope of the down tube at 2.5 inches past center or at sixty percent. A three inch piece of split seat tube can be brazed on first beneath the stays to reinforce the down tube. This was done to the prototypes but not proven necessary.

This rearrangement of the stays engulfs the bottom of the bicycle in a four sided triangulated structure of immense strenth enclosing the drive train in the triangular box that maintains rigidity where horizontal flex emanates: the bottom bracket. This rigid triangular structure on down tube extends from approximately 9 inches below head tube to the rear axle. It brooks no horizontal flex within its perimeter, leaving two flexible points: the seat tube (prime offender) and short upper section of down tube, that is too short to flex once seat tube is stiffened: either by indenting rear of seat tube adjacent to brake bridge or by an offset in the seat tube approx. 10 inches above the bottom bracket. Either works and both add to caliper clearance, a necessity with short chain stays. Without the indentation or offset in seat tube this triangulated design is still stiffer than conventional frames but offset or indentation quells any leftover flex and virtually eliminates snaking: the syndrome causing a continuous S when cranking. That, if absent, makes bikes faster: The shortest distance is a straight line.

An unexpected result is how merging the stays into the down tube would stabilize the fork and front wheel. Some modern designers have gone to enlarged triangular down tubes for stiffness, but, triangulating the down tube with extended stays buttresses the down tube and plants the front wheel for the most stable steering imaginable.

The invention is sound. It has been thoroughly tested to the tune of several ruined rims. It flexes vertically and will not bend out of shape or break. Under severe enough impact it will rebound and launch the rider before it breaks.

Over bumpy roadway impact transfers direct from the rear axle up the stays through the short down tube to the fork planting the front wheel as the two wheels are not much more directly connected and can talk. This all happens as major rebound forces bypass the seat tube and rider sitting isolated in the bottom bracket, with, the rear wheel freed (of rider weight) to follow road undulations. It is imbued with marvelous snapback resiliency that stores energy and gives it back with every thrusts for a gloriously lively ride.

The short upper section of down tube had initial strength questions, but it doesn't flex with standard size down tubes once the seat tube is stiffened.

Another postive aspect of stays bypassing the seat tube is a bicycle that's no longer dependent on size for resilience, as, stay length is about the same for all size.

Caution: too much heat on upper surface of down tube when brazing on stays can (ever so slightly) bow out the down tube.

When mitering the ends of stays be certain to make both identical as symmetry is a requisite. Clamp stays down diagonally with tops merging together and miter at approx. 28–30 degrees to fit down tube.

This invention should work minus the halved section of seat tube for reinforcement. It was added to the prototype as a precaution but vertical forces at the rear wheel flex the stays with little effect at the down tube junction.

The bicycle is on an upper level in all aspects. It goes through slaloms with cones half the distance at the same speed, with handling that feels nimble and safe in a pack and much more sure footed if jostled. An ability to ride fast and secure through narrow curbed lanes of cemeteries where there is no room for error: Bringing another level of security, efficiency and comfort while feeling 10 percent or more faster.

Eliminating stays as a direct line of shock to the base of spine was the goal and more resilience at the rear and a stiffer bottom bracket were anticipated. But the greatly improved tracking and agility that makes it so much easier to avoid contact in a pack and change lines in mid corner was totally unexpected.

There is nothing to prohibit this bicycle because nothing has been changed. The realignment of the stays changes nothing. Yet, it changes everything. Conventional bicycles will not be able to compete: But, banning it would be a travesty. I think the safety factor alone is too great to negate.

I claim:

1. A bicycle frame comprising:

a head tube with upper and lower ends, a seat support tube with upper and lower ends, a top tube extending horizontally between said upper end of said head tube and said upper end of said seat support tube, a down tube extending diagonally from said lower end of said heat tube to said lower end of said seat support tube, wherein said down tube and said seat tube are joined by a bottom bracket, a pair of seat stays, each having one end with an axle dropout for attachment of a wheel, and a pair of chain stays extending from said bottom bracket to said axle dropouts, said seat stays each extending diagonally past either side of said seat support tube and having a second end attached to said down tube at a point above a center point of said down tube when measuring from said bottom bracket.

* * * * *